US011990288B2

(12) United States Patent
Wang et al.

(10) Patent No.: US 11,990,288 B2
(45) Date of Patent: May 21, 2024

(54) SWITCHING COMPONENTS WITH REDUNDANT CONTACT PADS

(71) Applicant: Honeywell International Inc., Charlotte, NC (US)

(72) Inventors: Houyong Wang, Charlotte, NC (US); Yu Hu, Charlotte, NC (US); Yin Wei, Charlotte, NC (US); Jie Rao, Charlotte, NC (US); Fan Yang, Charlotte, NC (US); Peipei Liu, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 157 days.

(21) Appl. No.: 17/652,108

(22) Filed: Feb. 23, 2022

(65) Prior Publication Data

US 2022/0277905 A1 Sep. 1, 2022

(30) Foreign Application Priority Data

Feb. 26, 2021 (CN) ......................... 202110216108.4

(51) Int. Cl.
*H01H 1/20* (2006.01)
*H01H 15/04* (2006.01)
*H01H 15/06* (2006.01)

(52) U.S. Cl.
CPC .............. *H01H 1/20* (2013.01); *H01H 15/04* (2013.01); *H01H 15/06* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 6,198,058 B1 * | 3/2001 | Graninger | H01H 13/503 200/16 R |
| 2013/0192968 A1 * | 8/2013 | Schlegel | H01H 1/2025 200/502 |
| 2020/0144005 A1 * | 5/2020 | Thizon | H01H 13/04 |

* cited by examiner

*Primary Examiner* — Ahmed M Saeed
(74) *Attorney, Agent, or Firm* — Alston & Bird LLP

(57) ABSTRACT

Methods, apparatuses and systems for providing a switching component are disclosed herein. An example switching component may comprise: A switching component comprising: a housing; a carrier body disposed within the housing; a first pair of contact pads disposed on a first surface of the carrier body; and a second pair of contact pads disposed on a second surface of the carrier body, wherein each pair of contact pads is configured to independently make contact with adjacent bridge contact pads in order to actuate an electrical bridge in response to movement of the carrier body.

18 Claims, 6 Drawing Sheets

SWITCHING COMPONENTS WITH REDUNDANT CONTACT PADS

CROSS-REFERENCE TO RELATED APPLICATIONS

This application claims priority pursuant to 35 U.S.C. 119(a) to China Patent Application No. 202110216108.4, filed Feb. 26, 2021, which application is incorporated herein by reference in its entirety.

BACKGROUND

Switching components (e.g., a single pole double throw switch) comprising contact pads may be used in conjunction with a variety of electrical devices, circuits and systems. An example moveable contact pad may be configured to move to make contact with another contact pad in order to actuate an electrical bridge/terminal. Such switching components are plagued by technical challenges and limitations.

Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for providing a switching component.

In accordance with various examples of the present disclosure, a switching component is provided. The switching component may comprise: a housing; a carrier body disposed within the housing; a first pair of contact pads disposed on a first surface of the carrier body; and a second pair of contact pads disposed on a second surface of the carrier body, wherein each pair of contact pads is configured to independently make contact with adjacent bridge contact pads in order to actuate an electrical bridge in response to movement of the carrier body.

In accordance with various examples of the present disclosure, another switching component is provided. The switching component may comprise: A switching component comprising: a housing; a carrier body disposed within the housing; a first flexible carrier comprising a first moveable contact pad and a second moveable contact pad, the first flexible carrier disposed on a first surface of the carrier body; and a second flexible carrier comprising a third moveable contact pad and a fourth moveable contact pad, the second flexible carrier disposed on a second surface of the carrier body, wherein each moveable contact pad is disposed adjacent a stationary contact pad, and wherein each moveable contact pad and stationary contact pad pair is configured to independently make contact with adjacent bridge contact pads in order to actuate an electrical bridge in response to movement of the carrier body.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
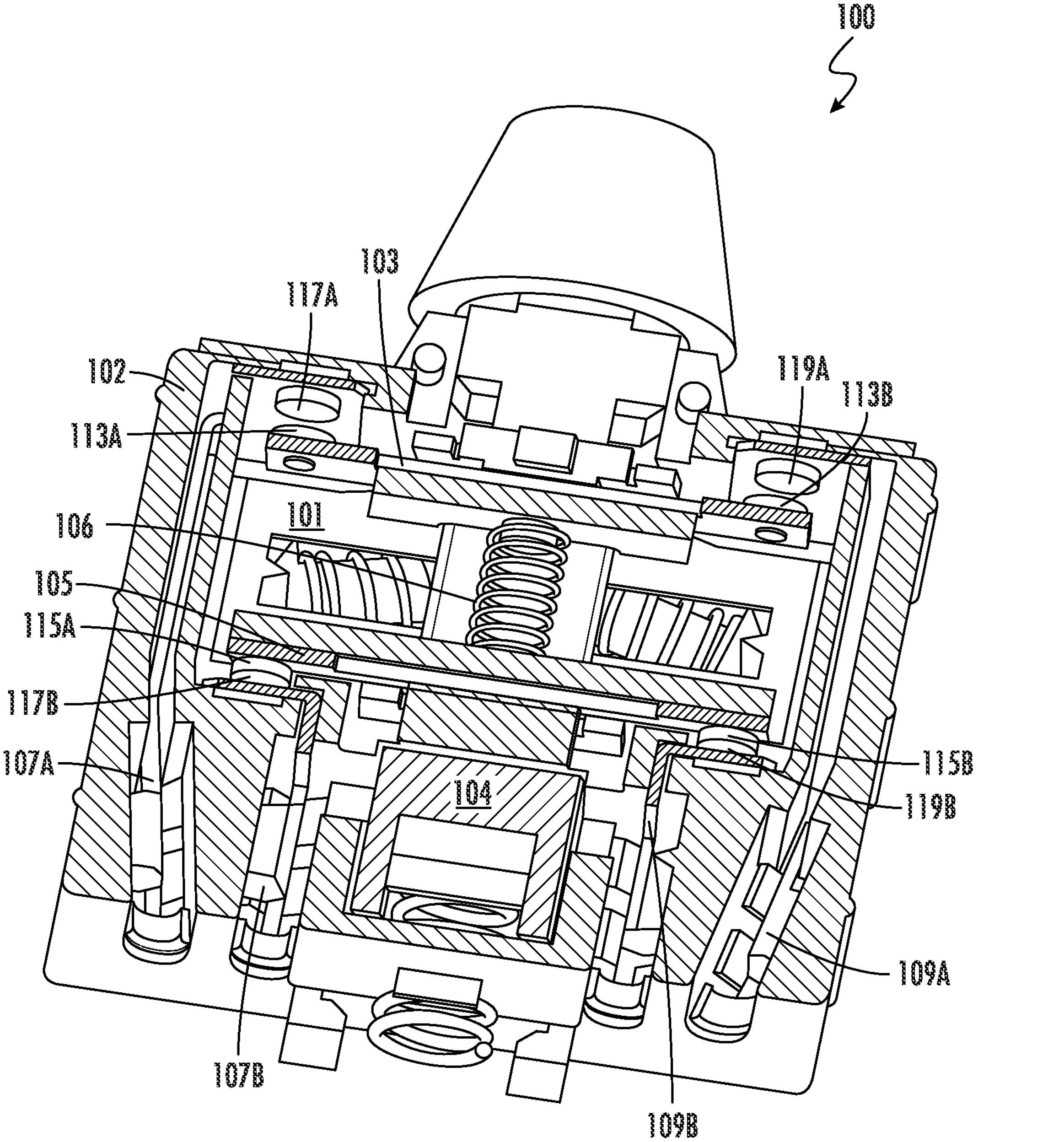
FIG. 1 illustrates an example switching component in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The terms "electronically coupled" or "in electronic communication with" in the present disclosure refer to two or more electrical elements (for example, but not limited to, an example processing circuitry, communication module, input/output module, memory, switching component) and/or electric circuit(s) being connected through wired means (for example but not limited to, conductive wires or traces) and/or wireless means (for example but not limited to, wireless network, electromagnetic field), such that electronic indications, signal or the like data and/or information (for example, electronic indications, signals) may be transmitted to and/or received from the electrical elements and/or electric circuit(s) that are electronically coupled.

The term "switching component" may refer to an electrical component or electromechanical device that can be configured to connect or disconnect a conducting path in an electrical circuit such that electrical current flowing along the conducting path is interrupted or diverted. Switching components may be used in a variety of applications to control electrical circuits. An example single pole double throw switch may comprise one or more contacts pads. In various applications, when an example moveable contact pad and corresponding contact pad are in a closed state (i.e., make contact with one another), an electrical terminal/bridge is actuated such that electrical current can pass between them. In contrast, when the moveable contact pad and the corresponding contact pad are in an open state (i.e., not in contact with one another), no electrical current passes between them. The example moveable contact pad may be configured to move (e.g., bob, wobble, rotate, swing) relative to a corresponding contact pad such that an electrical connection can be formed between them. In some examples, misalignment between a moveable contact pad and a corresponding contact pad may result in electrical arcing or a failure to form a proper electrical connection between the moveable contact pad and the corresponding contact pad. Such contact failures may result in operational failure of the switching component.

Switching components (e.g., a single pole double throw switch) may be used in a variety of applications with high safety and reliability requirements such as, for example, high-speed railway and subway applications. In such applications, an example parts per million (PPM) defective rate requirement may be close to zero. In one example, a switching component may be used as part of a circuit/system for providing an indication as whether a door of a train car is open or closed. Failure of the example switching component may result in an incorrect signal output which may result in accidents and/or endanger passengers.

In accordance with various embodiments of the present disclosure, example methods, apparatuses and systems are provided. In various embodiments, the present disclosure may provide a switching component comprising a housing, a carrier body disposed within the housing, a first pair of contact pads disposed on a first surface of the carrier body, and, a second pair of contact pads disposed on a second surface of the carrier body. Each pair of contact pads may be configured to independently make contact with adjacent bridge contact pads in order to actuate an electrical bridge in response to movement of the carrier body. The first pair of contact pads may comprise a first moveable contact pad and a first stationary contact pad. The second pair of contact pads may comprise a second moveable contact pad and a second stationary contact pad. Each moveable contact pad may be disposed on a surface of a flexible carrier, and each stationary contact pad may be disposed on a surface of a stationary carrier. The flexible carrier may be disposed on a top surface of the carrier body and the stationary carrier may be disposed on a bottom surface of the carrier body. Each moveable contact pad may be disposed at a first distance relative to the adjacent bridge contact pad, and each stationary contact pad may be disposed at a second distance relative to the adjacent bridge contact pad when the switching component is in an open position. The second distance may be greater than the first distance. The switching component may be configured as a single pole double throw switch. Each moveable contact pad may be configured to make contact with the adjacent bridge contact pad prior to a stationary contact pad making contact with the adjacent bridge contact pad. The switching component may further comprise a bridge assembly having each bridge contact pad fixedly attached thereto. The bridge assembly may comprise at least a first bridge element disposed adjacent a first side surface of the carrier body and at least a second bridge element disposed adjacent a second side surface of the carrier body.

In various embodiments, as described herein, the example switching component can operate in a fashion so as to achieve system redundancy. For example, by utilizing pairs and/or sets of contacts in a redundant configuration (e.g., a moveable contact pad and a stationary contact pad forming a pair of contacts) instead of a single moveable contact pad for an electrical terminal/bridge, if one of the pair of contact pads fails to make proper contact with a corresponding contact pad (e.g., a bridge contact pad), the electrical terminal/bridge will still be actuated. Thus, using the apparatuses and techniques disclosed herein, the reliability of an example switching component (e.g., a single pole double throw switch) can be greatly increased. Further, by positioning redundant contact pads (e.g., a moveable contact pad and a stationary contact pad) at variable distances in relation to adjacent bridge contact pads, the likelihood that at least one of the contact pads will make proper contact with the adjacent bridge contact pad is significantly increased. Additionally, in various examples, the dimensions and profile of the switching components described herein may be similar to known switching components such that the example switching component can easily be substituted and incorporated into existing systems.

Referring now to FIG. 1, an example schematic diagram depicting an example switching component 100 in accordance with various embodiments of the present disclosure is provided. The example switching component 100 may be a single pole double throw switch. In particular, as depicted, the example switching component 100 comprises a housing 102, a carrier body 101, a first flexible carrier 103 comprising at least a first moveable contact pad 113A and at least a second moveable contact pad 113B, a second flexible carrier 105 comprising at least a first moveable contact pad 115A and at least a second moveable contact pad 115B, a first bridge element 107A comprising at least a bridge contact pad 117A, a second bridge element 107B comprising at least a bridge contact pad 117B, a third bridge element 109A comprising at least a bridge contact pad 119A, a fourth bridge element 109B comprising at least a bridge contact pad 119B, a moveable armature 104 and a spring 106. The example switching component 100 may be a component of an electrical system and/or in wired communication with other electrical components and/or devices. In various embodiments, as depicted the switching component 100 may be arranged, contained, or disposed partially or completely within the housing 102. The example housing 102 may comprise metal, plastic, combinations thereof, and/or the like.

As depicted in FIG. 1, the carrier body 101 comprises a moveable armature 104 and a spring 106 to facilitate movement of the carrier body 101 and/or other elements (e.g., first flexible carrier 103 or second flexible carrier 105). The example carrier body 101 may be or comprise an insulating material such as plastic. For example, the carrier body 101 may be configured to move/slide (e.g., vertically or in a y-direction) within the housing of the example switching component 100. As depicted, the carrier body 101 may be disposed within one or more inner surfaces of the housing 102 of the switching component 100 (e.g., via a guideway).

As noted above, the example switching component 100 comprises a first flexible carrier 103 and a second flexible carrier 105. In various embodiments, each of the first flexible carrier 103 and the second flexible carrier 105 may comprise one or more moveable contact pads. For example, as depicted, the first flexible carrier 103 comprises a first moveable contact pad 113A and a second moveable contact pad 113B. Additionally, the second flexible carrier 105 comprises a first moveable contact pad 115A and a second moveable contact pad 115B. Each of the moveable contact pads 113A, 113B, 115A and 115B is configured to make contact with adjacent bridge contact pads of first bridge element 107A, second bridge element 109B, third bridge element 109A and fourth bridge element 109B in order to actuate an electrical terminal/bridge. Additionally, each of the first flexible carrier 103 and the second flexible carrier 105 may be disposed adjacent a respective stationary carrier having stationary contact pads disposed thereon. For example, each of the moveable contact pads 113A, 113B, 115A and 115B may be disposed adjacent (e.g., coplanar with) a stationary contact pad. The example stationary contact pads may be disposed and/or attached to a surface or element of the example switching component 100 (e.g., a stationary carrier). Accordingly each stationary contact pad and moveable contact pad 113A, 113B, 115A and 115B may define a pair of contact pads (e.g., a moveable contact pad and a stationary contact pad). Each pair of contact pads may be configured to make contact with an adjacent set of stationary contact pads in order to actuate an electrical terminal/bridge.

The first flexible carrier 103 may be disposed on/attached to surface of the carrier body 101. For example, as depicted in FIG. 1, the first flexible carrier 103 is attached to a top surface of the carrier body 101. As shown, the first flexible carrier 103 may be a substantially planar substrate having at least a first moveable contact pad 113A and a second contact pad 113B disposed thereon. For example, as depicted, the first contact pad 113A and the second contact pad 113B are fixedly attached to a top surface of the first flexible carrier 103. The first flexible carrier 103 may be disposed on/attached to a surface of the carrier body 101. For example, the first flexible carrier 103 may be directly mounted to a surface of the carrier body 101 using one or more screws, clips, combinations thereof, and/or the like.

Similarly, the second flexible carrier 105 may be disposed on/attached to a surface of the carrier body 101. As depicted in FIG. 1, the second flexible carrier 105 is attached to a bottom surface of the carrier body 101. As shown, the second flexible carrier 105 may be a substantially planar substrate having at least a first moveable contact pad 115A and at least a second moveable contact pad 115B disposed thereon. For example, as depicted, the first moveable contact pad 115A and the second moveable contact pad 113B are fixedly attached to a bottom surface of the second flexible carrier 105. The second flexible carrier 105 may be disposed on/attached to a surface of the carrier body 101. For example, the second flexible carrier 103 may be directly mounted to a surface of the carrier body 101 using one or more screws, clips, combinations thereof, and/or the like.

In various examples, each of the bridge elements 107A, 107B, 109A and 109B may comprise a conductive metal substrate disposed adjacent a side body of the carrier body 101. In various examples, at least a portion and/or surface of each of the bridge elements 107A, 107B, 109A and 109B may be attached to an inner surface of the housing 102 of the switching component 100. In some examples, each bridge element 107A, 107B, 109A and 109B may comprise, silver, nickel, copper, cadmium oxide, tin oxide, combinations thereof, and/or the like. Each bridge element 107A, 107B, 109A and 109B may be in wired communication with/electrically connected to other elements, components and/or devices within an electrical circuit/system. In various examples, each of the bridge elements 107A, 107B, 109A and 109B may define a unitary body or may comprise a plurality of coupled or distinct elements. In one example, the first bridge element 107A and the second bridge element 107B may be attached to one another.

As depicted in FIG. 1, the first bridge element 107A and the second bridge element 107B are positioned adjacent a first surface (e.g., left side body) of the carrier body 101 within the housing 102. Additionally, a first end portion of the first bridge element 107A is positioned adjacent a top surface of the carrier body 101/the first flexible carrier 103. Similarly, a first end portion of the second bridge element 107 is positioned adjacent a bottom surface of the carrier body 101/the second flexible carrier 105. As shown, the bridge contact pad 117A of the first bridge element 107A is positioned adjacent (e.g., above) a corresponding first moveable contact pad 113A of the first flexible carrier 103). As shown, the bridge contact pad 117B of the second bridge element 107B is positioned adjacent (e.g., below) the first moveable contact pad 115A of the second flexible carrier 105.

As further depicted, the third bridge element 109A and the fourth bridge element 109B are positioned adjacent a second surface (e.g., right side body) of the carrier body 101 within the housing 102. Additionally, a first end portion of the third bridge element 109A is positioned adjacent a top surface of the carrier body 101/the first flexible carrier 103. As depicted, a first end portion of the fourth bridge element 109B is positioned adjacent a bottom surface of the carrier body 101/the second flexible carrier 105. As shown, the bridge contact pad 119A of the third bridge element 109A is positioned adjacent (e.g., above) the second moveable contact pad 113B of the first flexible carrier 103. As shown, the bridge contact pad 119B of the fourth bridge element 109B is positioned adjacent (e.g., below) the second moveable contact pad 115B of the second flexible carrier 105.

The carrier body 101 may be configured to move (e.g., vertically or in a y-direction) such that one or more bridge contact pads make contact with a respective moveable contact pad in order to actuate an electrical terminal/bridge. For example, the carrier body 101 may move such that the bridge contact pad 117A of the first bridge element 107A and a corresponding pair of contact pads including the first moveable contact pad 113A of the first flexible carrier 103 disposed on a top surface of the carrier body 101 make contact with one another in order to actuate an electrical terminal/bridge (e.g., the first bridge element 107A). In various examples, an example pair of contact pads may be configured to make contact with adjacent sets of bridge contact pads independently and/or sequentially.

In various examples, as depicted, each of the moveable contact pads, stationary contact pads and/or bridge contact pads 113A, 113B, 115A, 115B, 117A, 117B, 119A and 119B is fixedly attached to a surface of the switching component 100. Each contact pad 113A, 113B, 115A, 115B, 117A, 117B, 119A and 119B may comprise a substantially circular conductive metal material. An example contact pad 113A, 113B, 115A, 115B, 117A, 117B, 119A and 119B may comprise, for example, without limitation, silver, nickel, copper, cadmium oxide, tin oxide, combinations thereof, and/or the like.

While some of the embodiments herein provide an example switching component 100, it is noted that the scope of the present disclosure is not limited to such embodiments. For example, in some examples, a switching component 100 in accordance with the present disclosure may be in other forms. In some examples, an example switching component 100 may comprise one or more additional and/or alternative elements, and/or may be structured/positioned differently than that illustrated in FIG. 1. By way of example, each bridge element may comprise more than one bridge contact pad.

Figure 2:
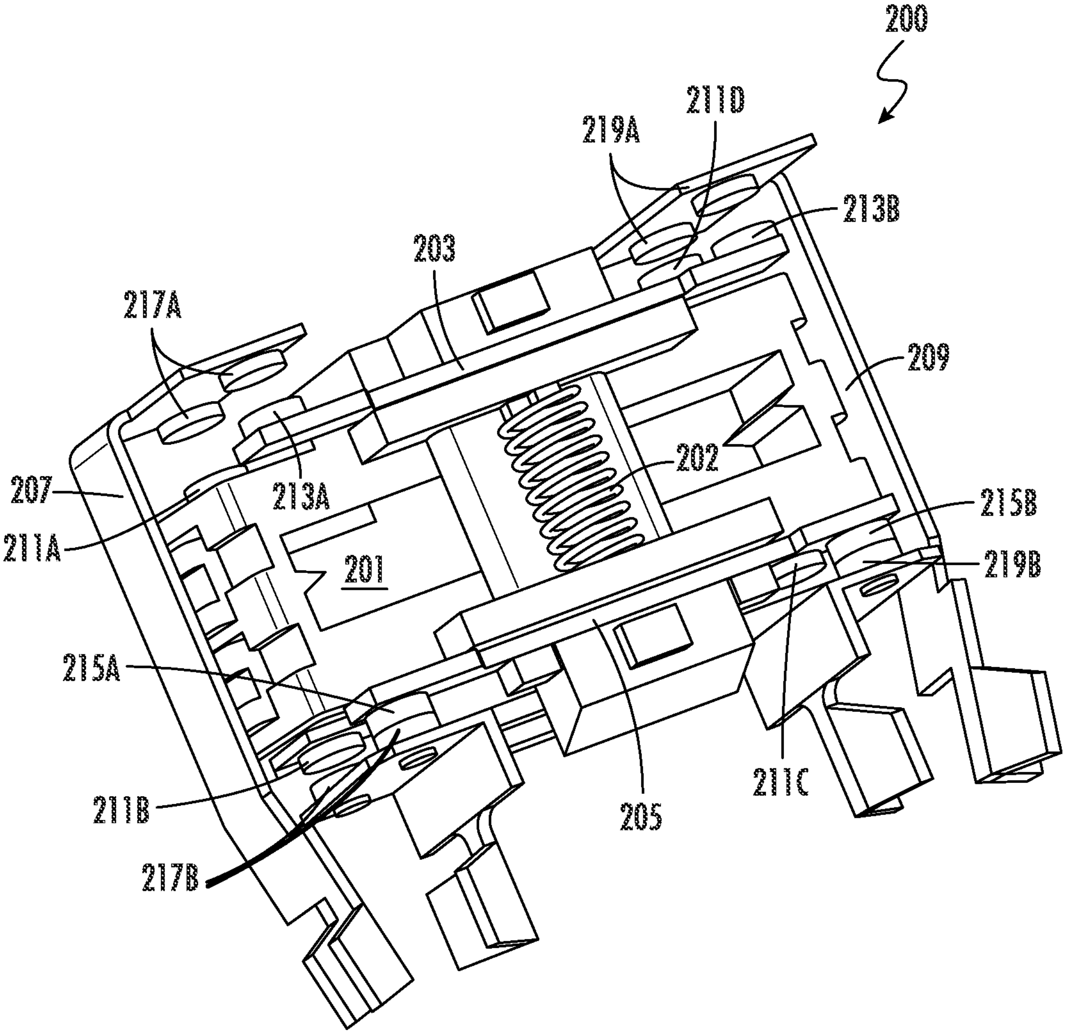
FIG. 2 illustrates an example switching component in accordance with various embodiments of the present disclosure.

Referring now to FIG. 2, an example schematic diagram depicting an example switching component 200 in accordance with various embodiments of the present disclosure is provided. The example switching component 200 may be a single pole double throw switch. In various embodiments, the example switching component 200 may also comprise a housing. In particular, as depicted, the example switching component 200 comprises a carrier body 201, a first flexible carrier 203 comprising at least a first moveable contact pad 213A and at least a second moveable contact pad 213B, a second flexible carrier 205 comprising at least a first moveable contact pad 215A and at least a second moveable contact pad 215B, a first bridge element 207 comprising a first set of bridge contact pads 217A and a second set of bridge contact pads 217B, and a second bridge element 209 comprising a first set of bridge contact pads 219A and a second set of bridge contact pads 219B. The example switching component 200 may be a component of an electrical system and/or in wired communication with other electrical components and/or devices. In various embodiments, the switching component 200 may be arranged, contained, or disposed partially or completely within a housing. The example housing may comprise metal, plastic, combinations thereof, and/or the like.

As noted above, and as depicted in FIG. 2, the switching component 200 comprises at least a first stationary contact pad 211A, a second stationary contact pad 211B, a third stationary contact pad 211C and a fourth stationary contact pad 211D. In some examples, each of the stationary contact pads 211A, 211B, 211C and 211D may be disposed on a stationary carrier or another surface or element of the example switching component 200. Each stationary contact pad 211A, 211B, 211C and 211D may be disposed adjacent a moveable contact pad defining a pair of contact pads. For example, as shown, the first stationary contact pad 211A and the first moveable contact pad 213A of the first flexible carrier 203 define a pair of contact pads. The example carrier body 201 may be configured to move such that a pair of contact pads (e.g., a moveable contact pad and a stationary contact pad) make contact with an adjacent set of stationary contact pads in order to actuate an electrical terminal/bridge.

In various embodiments, the carrier body 201 may comprise a moveable armature and a spring 202 to facilitate movement of the carrier body 201 and/or other elements (e.g., first flexible carrier 203 or second flexible carrier 205). The example carrier body 201 may be or comprise an insulating material such as plastic. For example, the carrier body 201 may be configured to move/slide (e.g., vertically or in a y-direction) within the housing of the example switching component 200. For example, the carrier body 201 may be attached to one or more inner surfaces of the example housing via a guideway.

As noted above, the example switching component 200 comprises a first flexible carrier 203 and a second flexible carrier 205. In various embodiments, each of the first flexible carrier 203 and the second flexible carrier 205 may comprise one or more moveable contact pads. For example, as shown, the first flexible carrier 203 comprises a first moveable contact pad 213A and a second moveable contact pad 213B. Additionally, the second flexible carrier 205 comprises a first moveable contact pad 215A and a second moveable contact pad 215B. Each of the moveable contact pads 213A, 213B, 215A and 215B is configured to make contact with adjacent bridge contact pads of first bridge element 207 or second bridge element 209 in order to actuate an electrical terminal/bridge. Additionally, each of the first flexible carrier 203 and the second flexible carrier 205 may be disposed adjacent a respective stationary carrier having stationary contact pads disposed thereon. By way of example, the first moveable contact pad 213A of the first flexible carrier 203 is disposed adjacent a first stationary contact pad 211A, defining a pair of contact pads. Similarly, the first moveable contact pad 215A of the second flexible carrier 205 is disposed adjacent a second stationary contact pad 211B defining another pair of contact pads.

The first flexible carrier 203 may be disposed on/attached to surface of the carrier body 201. For example, as depicted in FIG. 2, the first flexible carrier 203 is attached to a top surface of the carrier body 201. As shown, the first flexible carrier 203 may be a substantially planar substrate having at least a first moveable contact pad 213A and a second contact pad 213B disposed thereon. For example, as depicted, the first contact pad 213A and the second contact pad 213B are fixedly attached to a top surface of the first flexible carrier 203. In some examples, the first flexible carrier 203 may be directly mounted to a surface of the carrier body 201 using one or more screws, clips, combinations thereof, and/or the like.

Similarly, the second flexible carrier 205 may be disposed on/attached to a surface of the carrier body 201. As depicted in FIG. 2, the second flexible carrier 205 is attached to a bottom surface of the carrier body 201. As shown, the second flexible carrier 205 may be a substantially planar substrate having at least a first moveable contact pad 215A and at least a second moveable contact pad 215B disposed thereon. For example, as depicted, the first moveable contact pad 215A and the second moveable contact pad 213B are fixedly attached to a bottom surface of the second flexible carrier 205. In some examples, the first flexible carrier 203 may be directly mounted to a surface of the carrier body 201 using one or more screws, clips, combinations thereof, and/or the like.

In various examples, each of the first bridge element 207 and the second bridge element 209 may comprise a conductive metal substrate disposed adjacent a side body of the carrier body 201. In various examples, at least a portion and/or surface of each of the bridge elements 207 and 209 may be attached to one or more inner surfaces of the example housing of the switching component 200. In some examples, each bridge element 207 and 209 may comprise, silver, nickel, copper, cadmium oxide, tin oxide, combinations thereof, and/or the like. Each bridge element 207 and 209 may be in wired communication with/electrically connected to other elements, components and/or devices within an electrical circuit/system. As noted above, the first bridge element 207 comprises a first set of bridge contact pads 217A and a second set of bridge contact pads 217B. Additionally, the second bridge element 209 comprises a first set of bridge contact pads 219A and a second set of bridge contact pads 219B. In various examples, each of the first bridge element 207 and the second bridge element 209 may define a unitary body or may comprise a plurality of coupled or distinct elements.

As depicted in FIG. 2, the first bridge element 207 is positioned adjacent a first surface (e.g., left side body) of the carrier body 201. Additionally, a first end portion of the first bridge element 207 is positioned adjacent a top surface of the carrier body 201/the first flexible carrier 203. Similarly, a second end portion of the first bridge element 207 is positioned adjacent a bottom surface of the carrier body 201/the second flexible carrier 205. As shown, the first set of bridge contact pads 217A of the first bridge element 207 are positioned adjacent (e.g., above) a corresponding pair of contact pads (e.g., the first moveable contact pad 213A of the first flexible carrier 203 and the adjacent first stationary contact pad 211A). As shown, the second set of bridge contact pads 217B of the first bridge element 207 are positioned adjacent a corresponding set of contact pads (e.g., the first moveable contact pad 215A of the second flexible carrier 205 and the adjacent stationary contact pad 211B).

As further depicted, the second bridge element 209 is positioned adjacent a second surface (e.g., right side body) of the carrier body 201. Additionally, a first end portion of the second bridge element 209 is positioned adjacent a top surface of the carrier body 201/the first flexible carrier 203. As depicted, a second end portion of the second bridge element 209 is positioned adjacent a bottom surface of the carrier body 201/the second flexible carrier 205. As shown, the first set of bridge contact pads 219A of the second bridge element 209 are positioned adjacent a corresponding pair of contact pads (e.g., the second moveable contact pad 213B of the first flexible carrier 203 and the adjacent fourth stationary contact pad 211D). As shown, the second set of bridge contact pads 219B of the second bridge element 209 are positioned adjacent a corresponding pair of contact pads (e.g., second moveable contact pad 215B of the second flexible carrier 205 and the adjacent third stationary contact pad 211C).

The carrier body 201 may be configured to move vertically (e.g., in a y-direction) such that the first set of bridge contact pads 217A of the first bridge element 207 and a corresponding pair of contact pads (e.g., first moveable contact pad 213A of the first flexible carrier 203 and the adjacent stationary contact pad 211A) disposed on a top surface of the carrier body 201 make contact with one another in order to actuate an electrical terminal/bridge (e.g., the first bridge element 207). The carrier body 201 may be configured to move (e.g., vertically or in a y-direction) such that the second set of bridge contact pads 217B of the first bridge element 207 and a corresponding pair of contact pads (e.g., the first moveable contact pad 215A of the second flexible carrier 205 and the second stationary contact pad 211B disposed on a bottom portion of the carrier body 201) make contact in order to actuate an electrical terminal/bridge (e.g., the first bridge element 207). In some examples, each pair of contact pads may be configured to make contact with adjacent sets of bridge contact pads independently and/or sequentially.

Similarly, the carrier body 201 may be configured to move vertically (e.g., in a y-direction) such that the first set of bridge contact pads 219A of the second bridge element 209 and a corresponding pair of contact pads (e.g., the second moveable contact pad 213B of the first flexible carrier 203 and the fourth stationary contact pad 211D disposed on a top surface of the carrier body 201) make contact with one another in order to actuate an electrical terminal/bridge (e.g., the second bridge element 209). The carrier body 201 may be configured to move (e.g., vertically or in a y-direction) such that the second set of bridge contact pads 219B of the second bridge element 209 and a corresponding pair of contact pads (e.g., the second moveable contact pad 215B of the second flexible carrier 205 and the third stationary contact pad 211C) disposed on a bottom surface of the carrier body 201 make contact in order to actuate an electrical terminal/bridge (e.g., the second bridge element 209).

In various examples, as depicted, each of the moveable contact pads, stationary contact pads and/or bridge contact pads 211A, 211B, 211C, 211D, 213A, 213B, 215A, 215B, 217A, 217B, 219A and 219B is fixedly attached to a surface of the switching component 200. Each contact pad 211A, 211B, 211C, 211D, 213A, 213B, 215A, 215B, 217A, 217B, 219A and 219B may comprise a substantially circular conductive metal material. An example contact pad 211A, 211B, 211C, 211D, 213A, 213B, 215A, 215B, 217A, 217B, 219A and 219B may comprise, for example, without limitation, silver, nickel, copper, cadmium oxide, tin oxide, combinations thereof, and/or the like.

While some of the embodiments herein provide an example switching component 200, it is noted that the scope of the present disclosure is not limited to such embodiments. For example, in some examples, a switching component 200 in accordance with the present disclosure may be in other forms. In some examples, an example switching component 200 may comprise one or more additional and/or alternative elements, and/or may be structured/positioned differently than that illustrated in FIG. 2. By way of example, instead of a moveable contact pad and adjacent stationary contact pad (i.e., a pair of contacts), more than one moveable contact pad and more than one adjacent stationary contact pad may be provided.

Figure 3:
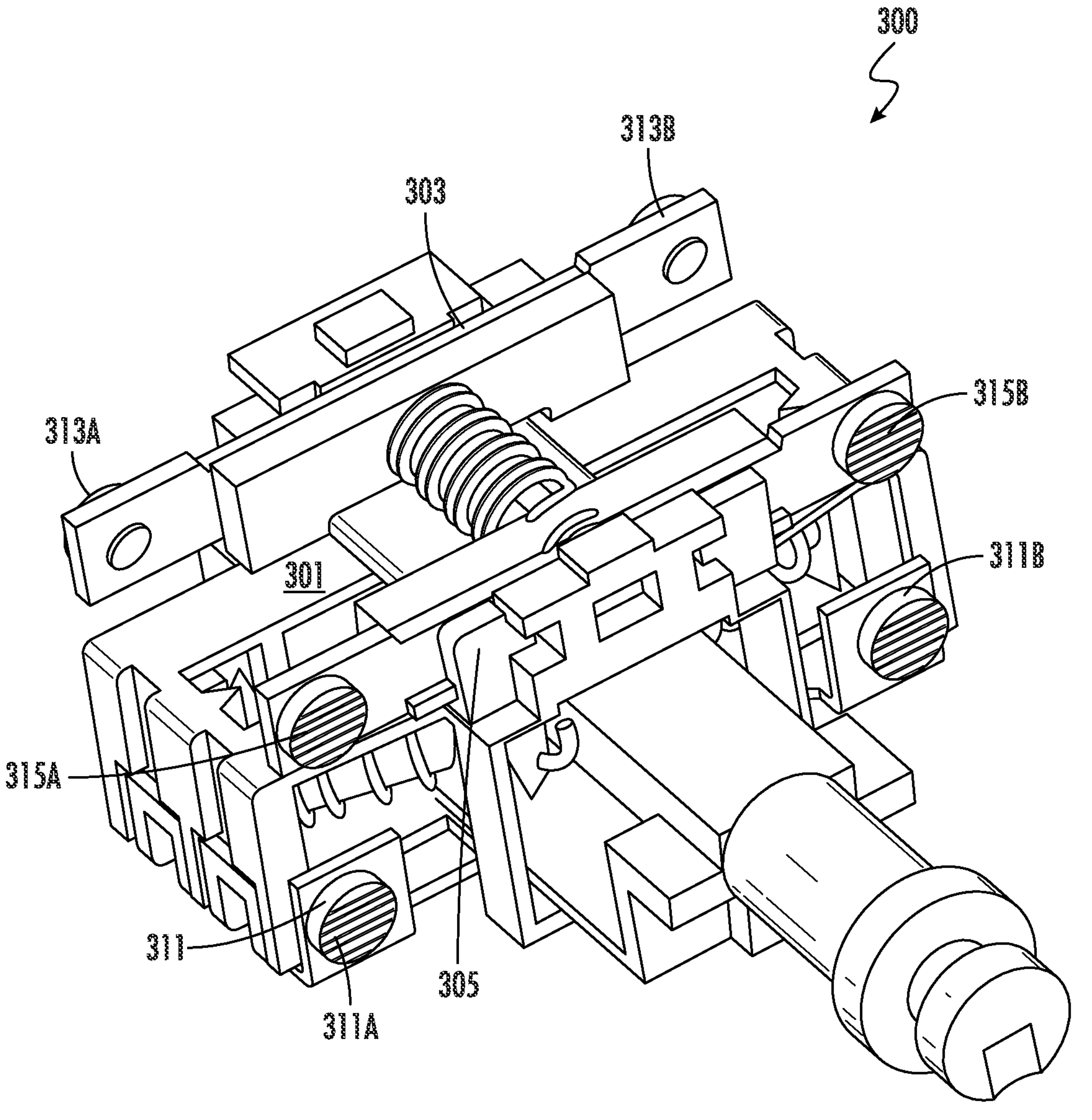
FIG. 3 illustrates an example carrier assembly in accordance with various embodiments of the present disclosure.

Referring now to FIG. 3, an example schematic diagram depicting an example carrier assembly 300 in accordance with various embodiments of the present disclosure is provided. As depicted, the example carrier assembly 300 comprises a carrier body 301, a first stationary carrier 321 comprising a first stationary contact pad 321A and a second stationary contact pad 321B, a first flexible carrier 303 comprising a first moveable contact pad 313A and a second moveable contact pad 313B and a second flexible carrier 305 comprising a first moveable contact pad 315A and a second moveable contact pad 315B. The example carrier assembly 300 may be at least partially disposed within a housing of an example switching component.

As noted above in connection with FIG. 2, the carrier body 301 may be configured to move (e.g., vertically or in a y-direction) within a housing of an example switching component such that one or more pairs of moveable contacts and stationary contacts make contact (e.g., with adjacent bridge contact pads of a bridge element) in order to actuate an electrical terminal/bridge. As depicted, the example carrier assembly 300 comprises a first flexible carrier 303 and a second flexible carrier 305. Each of the first flexible carrier 303 and the second flexible carrier 305 comprises one or more moveable contact pads 313A, 313B, 315A and 315B configured to independently and/or sequentially make contact with adjacent/corresponding bridge contact pads of the example switching component in order to actuate an electrical terminal/bridge. In various embodiments, the carrier body 301 may comprise a moveable armature and a spring 302 to facilitate movement of the carrier body 301 and/or other elements (e.g., first flexible carrier 303 and second flexible carrier 305). In various embodiments, the first flexible carrier 303 and the second flexible carrier 305 are configured to move sequentially to make contact with adjacent bridge contact pads of the example switching component. For example, the first flexible carrier 303 may be configured to move prior to the second flexible carrier 305 in response to movement of the carrier body 301.

As depicted in FIG. 3, the first flexible carrier 303 of the example carrier assembly 300 may be disposed on a top surface of the carrier body 301. For example, as shown, the first flexible carrier 303 is attached to a top surface of the carrier body 301. As depicted, the first flexible carrier 303 may be a substantially planar substrate having a first moveable contact pad 313A and a second moveable contact pad 313B disposed thereon. For example, as depicted, the first moveable contact pad 313A and the second moveable contact pad 313B are fixedly attached to a top surface of the first flexible carrier 303.

In various examples, the second flexible carrier 305 of the example carrier assembly 300 is configured to be disposed or attached to a surface of the carrier body 301. For example, as depicted in FIG. 3, the second flexible carrier 305 of the example carrier assembly 300 is disposed on a bottom surface of the carrier body 301. As shown, the second flexible carrier 305 may be a substantially planar substrate having a first moveable contact pad 315A and a second moveable contact pad 315B disposed thereon. For example, as depicted, the first moveable contact pad 315A and the second moveable contact pad 315B are fixedly attached to a bottom surface of the second flexible carrier 305. Additionally, as depicted, the carrier body 301 comprises at least a stationary carrier 321 having a first stationary contact pad 321A and a second stationary contact pad 321B fixedly attached thereto. As shown, the stationary carrier may be disposed on a bottom surface of the carrier body 301. In some examples, the first moveable contact pad 315A and the first stationary contact pad 321A define a first pair of contact pads (e.g., adjacent a set of bridge contact pads of a bridge element) and the second moveable contact pad 315B and the second stationary contact pad 321B define a second pair of contact pads (e.g., adjacent a set of bridge contact pads of a bridge element). Each contact pad 321A, 321B, 313A, 313B, 315A and 315B may comprise a substantially circular conductive metal material. The example contact pad 321A, 321B, 313A, 313B, 315A and 315B may comprise, for example, without limitation, silver, nickel, copper, cadmium oxide, tin oxide, combinations thereof, and/or the like.

While some of the embodiments herein provide an example carrier assembly 300, it is noted that the scope of the present disclosure is not limited to such embodiments. For example, in some examples, a carrier assembly 300 in accordance with the present disclosure may be in other forms. In some examples, a carrier assembly 300 may comprise one or more additional and/or alternative elements, and/or may be structured/positioned differently than that illustrated in FIG. 3.

Figure 4:
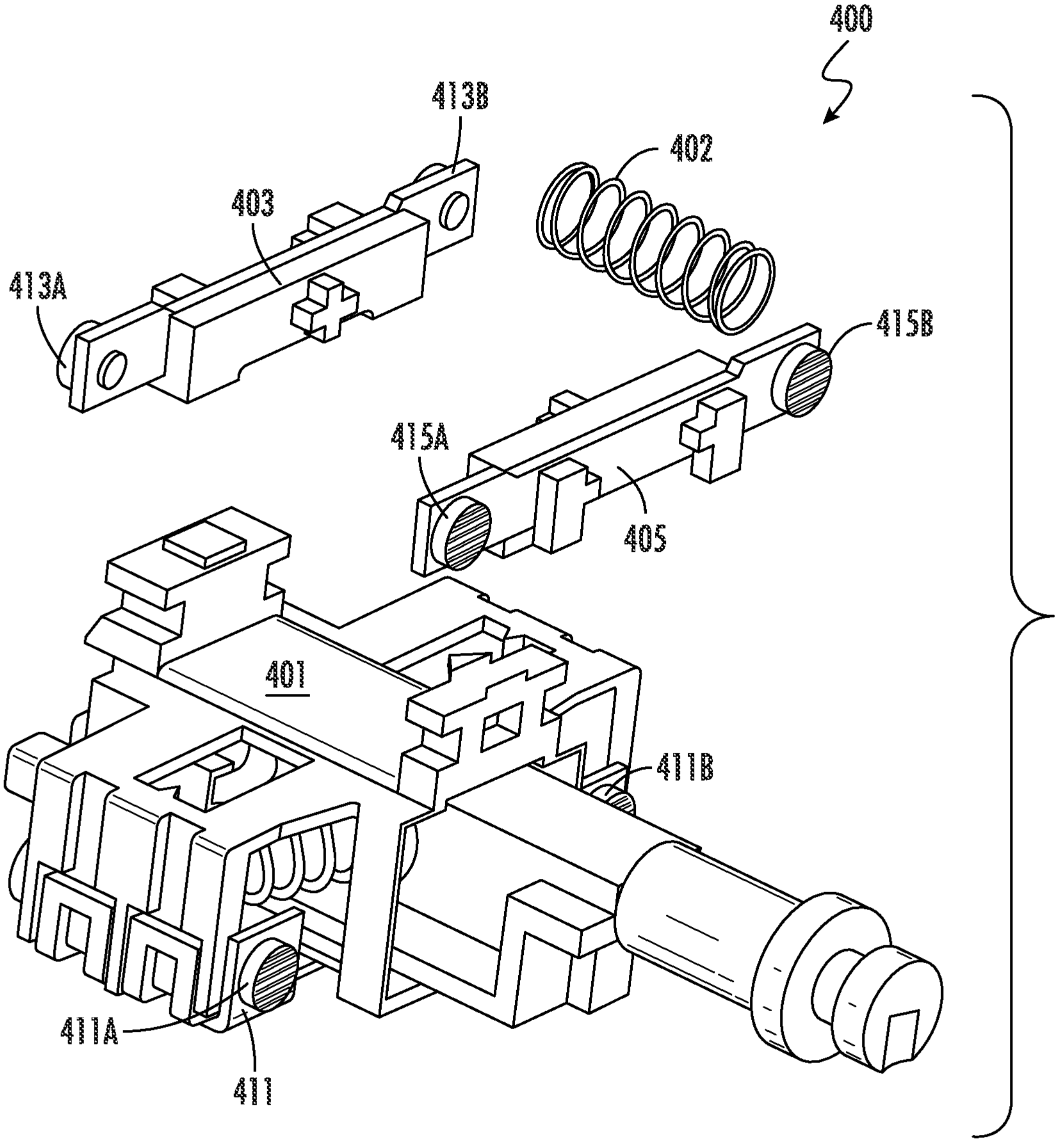
FIG. 4 illustrates an example carrier assembly in accordance with various embodiments of the present disclosure.

Referring now to FIG. 4, an example schematic diagram depicting an exploded view of an example carrier assembly 400 in accordance with various embodiments of the present disclosure is provided. As depicted, the example carrier assembly 400 comprises a carrier body 401, at least one stationary carrier 421 comprising a first stationary contact pad 421A and a second stationary contact pad 421B, a first flexible carrier 403 comprising a first moveable contact pad 413A and a second moveable contact pad 413B. Additionally, the example carrier assembly 400 comprises a second flexible carrier 405 comprising a first moveable contact pad 415A and a second moveable contact pad 415B. The example carrier assembly 400 may be at least partially disposed within a housing of an example switching component.

As noted above in connection with FIG. 3, the carrier body 401 may be configured to move (e.g., vertically or in a y-direction) within a housing of an example switching component such that one or more pairs of moveable contact pads and stationary contact pads make contact in order to actuate an electrical terminal/bridge. For example, each of moveable contact pads 413A, 413B, 415A and 415B and stationary contact pads 421A and 421B (e.g., each moveable contact pad and stationary contact pad pair) may be configured to independently make contact with adjacent/corresponding bridge contact pads of the example bridge element/switching component in order to actuate an electrical terminal/bridge in response to movement of the carrier body 401. In various embodiments, the carrier body 401 may comprise a moveable armature and a spring 402 to facilitate movement of the carrier body 401 and/or other elements (e.g., first flexible carrier 403 and second flexible carrier 405). In various embodiments, the first flexible carrier 403 and the second flexible carrier 405 are configured to move sequentially to make contact with adjacent bridge contact pads of the example switching component. For example, the first flexible carrier 403 may be configured to move prior to the second flexible carrier 405 in response to movement of the carrier body 401.

The first flexible carrier 403 of the example carrier assembly 400 is disposed on surface of the carrier body 401. For example, as depicted, the first flexible carrier 403 is attached to a top surface of the carrier body 401. As shown, the first flexible carrier 403 may be a substantially planar substrate having at least a first moveable contact pad 413A and at least a second moveable contact pad 413B disposed thereon. For example, as depicted, the first moveable contact pad 413A and the second moveable contact pad 413B are fixedly attached to a top surface of the first flexible carrier 403.

In some examples, the second flexible carrier 405 of the example carrier assembly 400 is configured to be disposed or attached to a surface of the carrier body 401. For example, as shown, the second flexible carrier 305 is configured to be attached to a bottom surface of the carrier body 401. As depicted, the second flexible carrier 405 may be a substantially planar substrate having at least a first moveable contact pad 415A and at least a second moveable contact pad 415B disposed thereon. For example, as depicted, the first moveable contact pad 415A and the second moveable contact pad 415B are fixedly attached to a bottom surface of the second flexible carrier 405. Additionally, as depicted, the carrier body 401 comprises at least a first stationary contact pad 421A and a second stationary contact pad 421B, each fixedly attached to a surface of a stationary carrier 421. Additionally, as depicted, the carrier body 401 comprises at least a stationary carrier 421 having a first stationary contact pad 421A and a second stationary contact pad 421B fixedly attached thereto. As shown, the stationary carrier 421 may be disposed on a bottom surface of the carrier body 401. In some examples, the first moveable contact pad 415A and the first stationary contact pad 421A define a first pair of contact pads (e.g., adjacent a set of bridge contact pads of a bridge element) and the second moveable contact pad 415B and the second stationary contact pad 421B define a second pair of contact pads (e.g., adjacent a set of bridge contact pads of a bridge element). Each contact pad 421A, 421B, 413A, 413B, 415A and 415B may comprise a substantially circular conductive metal material. The example contact pad 421A, 421B, 413A, 413B, 415A and 415B may comprise, for example, without limitation, silver, nickel, copper, cadmium oxide, tin oxide, combinations thereof, and/or the like.

While some of the embodiments herein provide an example carrier assembly 400, it is noted that the scope of the present disclosure is not limited to such embodiments. For example, in some examples, a carrier assembly 400 in accordance with the present disclosure may be in other forms. In some examples, a carrier assembly 400 may comprise one or more additional and/or alternative elements, and/or may be structured/positioned differently than that illustrated in FIG. 4.

Figure 5:
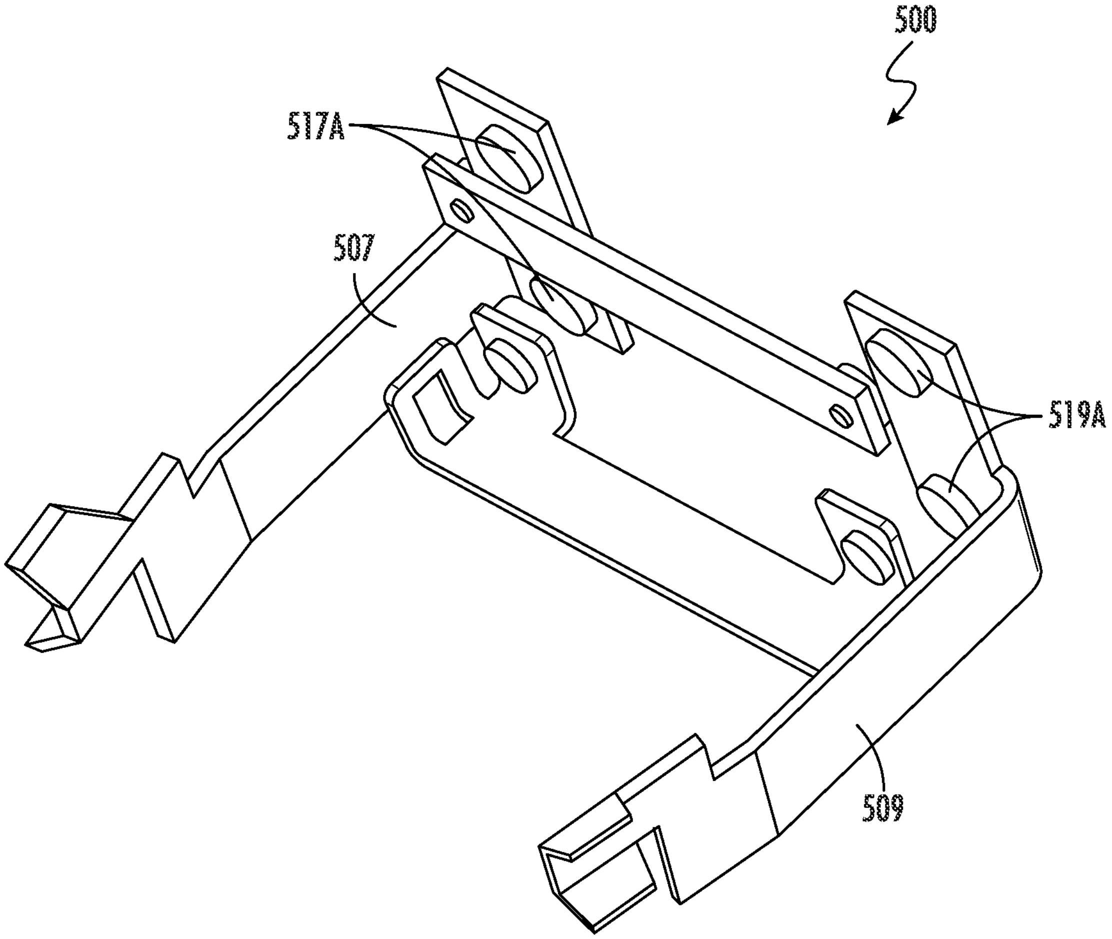
FIG. 5 illustrates an example bridge assembly in accordance with various embodiments of the present disclosure.

Referring now to FIG. 5, an example schematic diagram depicting a bridge assembly 500 is provided. As depicted, the example bridge assembly 500 comprises a first bridge element 507 comprising a set of bridge contact pads 517A and a second bridge element 509 comprising a set of bridge contact pads 519A. Each set of bridge contact pads 517A and 519A may be configured to make contact with adjacent/corresponding contact pads (e.g., a moveable contact pad and stationary contact pad pair) in order to actuate a respective electrical terminal/bridge. The example bridge assembly 500 may be a component of an example switching component. The example bridge assembly 500 may be a component of an electrical system and/or in wired communication with other electrical components and/or devices. In various embodiments, the bridge assembly 500 may be arranged, contained, or disposed partially or completely within a housing (e.g., a housing of the example switching component).

As noted above, the bridge assembly 500 comprises a first bridge element 507 comprising a set of bridge contact pads 517A. Additionally, the bridge assembly 500 comprises a second bridge element 509 comprising a set of bridge contact pads 519A. In various examples, each of the first bridge element 507 and the second bridge element 509 comprises a conductive metal substrate configured to be disposed adjacent a respective side body of an example switching component carrier body. In various examples, each of the first bridge element 207 and the second bridge element 209 may define a unitary body or may comprise a plurality of connected or distinct elements.

For example, the first bridge element 507 may be configured to be disposed adjacent a first surface (e.g., left hand side) of an example carrier body. Additionally, a first end portion (e.g., top portion) of the first bridge element 507 may be configured to be disposed adjacent/above a top surface of the example carrier body. In some examples, the set of bridge contact pads 517A may be disposed adjacent a corresponding pair of contact pads (e.g., disposed/positioned above a moveable contact pad and stationary contact pad pair) such that the set of bridge contact pads 517A can make contact with the pair of contact pads in order to actuate an electrical terminal/bridge. Similarly, the second bridge element 509 may be configured to be disposed adjacent a second surface (e.g., right hand side) of the example carrier body, opposite the first bridge element 507. Additionally, a first end portion (e.g., top portion) of the second bridge element 509 may be configured to be disposed adjacent/above a top surface of the example carrier body. In some examples, the set of bridge contact pads 519A may be disposed adjacent a corresponding pair of contact pads (e.g., disposed/positioned above a moveable contact pad and stationary contact pad pair) such that the set of bridge contact pads 519A can make contact with pair of contact pads in order to actuate an electrical terminal/bridge.

While some of the embodiments herein provide an example bridge assembly 500, it is noted that the scope of the present disclosure is not limited to such embodiments. For example, in some examples, a bridge assembly 500 in accordance with the present disclosure may be in other forms. In some examples a bridge assembly 500 may comprise one or more additional and/or alternative elements, and/or may be structured/positioned differently than that illustrated in FIG. 5.

Figure 6:
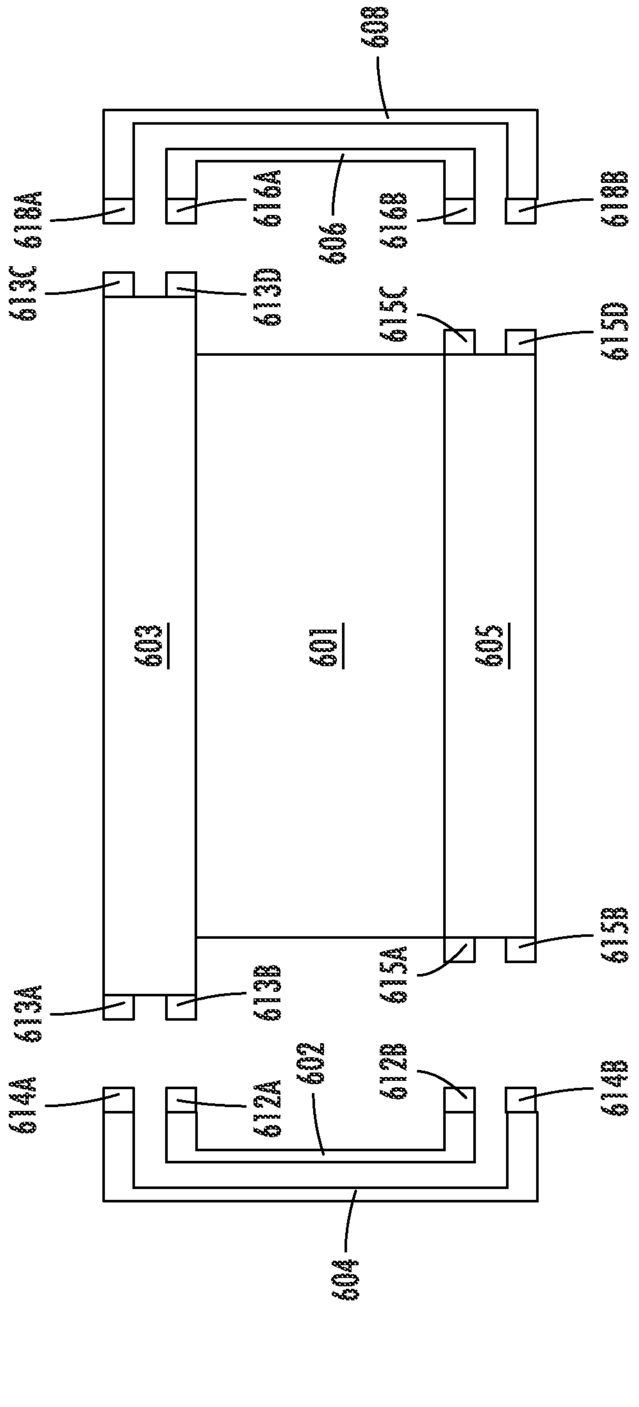
FIG. 6 illustrates a schematic diagram depicting an example switching component in accordance with various embodiments of the present disclosure.

Referring now to FIG. 6, an example schematic diagram depicting an example switching component 600 is provided. The example switching component 600 may be similar to the switching component 200 described above in connection with FIG. 2.

As depicted in FIG. 6, the example switching component 600 comprises a carrier body 501, a flexible carrier 503, a stationary carrier 505, a first bridge element 602, a second bridge element 604, a third bridge element 606 and a fourth bridge element 608. While, FIG. 6 depicts a single flexible carrier 503 and a single stationary carrier 505, the scope of the present disclosure in not limited to such embodiments. In various examples, a flexible carrier 503 in accordance with the present disclosure may be or comprise a plurality of distinct and/or coupled elements each disposed on one or more surfaces of the example carrier body 501. Similarly, a stationary carrier 505 in accordance with the present disclosure may be or comprise a plurality of distinct and/or coupled elements disposed on one or more surfaces of the example carrier body 501. The example flexible carrier 503 and the example stationary carrier 505 may comprise one or more substantially planar, rectangular substrates having a length and a width. In some embodiments, as shown, the length of the flexible carrier(s) 503 and the length of the stationary carrier(s) 505 may differ. In some examples, the dimensions of the stationary carrier(s) 505 may differ from the dimensions of the flexible carrier(s) 503 such that a distance between contact pads disposed on the stationary carrier(s) 505 and the bridge contact pads disposed on adjacent bridge element(s) when in an open position is greater than a distance between contact pads disposed on the flexible carrier(s) 503 and the bridge contact pads disposed on adjacent bridge element(s) when in an open position. By way of example, in an example switching component, the contact pads of an example flexible carrier may be disposed 0.5 mm from the contact pads of an example bridge element and the contact pads of a stationary carrier may be disposed 0.75 mm from the contact pads of the example bridge element when in an open position. In another example, the contact pads of an example flexible carrier may be disposed flush with (e.g., in contact with) the contact pads of an example bridge element and the contact pads of a stationary carrier may be disposed between 0.1 mm and 1 mm from the contacts pads of the example bridge element.

As depicted in FIG. 6, the flexible carrier 503 comprises a first moveable contact pad 613A, a second moveable contact pad 613B, a third moveable contact pad 613C and a fourth moveable contact pad 613D. As depicted, the stationary carrier 505 comprises a first stationary contact pad 615A, a second stationary contact pad 615B, a third stationary contact pad 615C and a fourth stationary contact pad 615D. As illustrated, the first moveable contact pad 613A and the second stationary contact pad 615B define a first pair of contact pads. As depicted, the second moveable contact pad 613B and the first stationary contact pad 615A define a second pair of contact pads. As depicted, the third moveable contact pad 613C and the fourth stationary contact pad 615D define a third pair of contact pads. As depicted, the fourth moveable contact pad 613D and the third stationary contact pad 615C define a fourth pair of contact pads.

As further depicted, the first bridge element 602 comprises a first bridge contact pad 612A and a second bridge contact pad 612B defining a first set of bridge contact pads. As shown, the second bridge element 604 comprises a first bridge contact pad 614A and a second bridge contact pad 614B defining a second set of bridge contact pads. As depicted, the third bridge element 606 comprises a first bridge contact pad 616A and a second bridge contact pad 616B defining a third set of bridge contact pads. As shown, the fourth bridge element 608 comprises a first bridge contact pad 618A and a second bridge contact pad 618B defining a fourth set of bridge contact pads.

In various examples, as depicted, the second pair of contact pads (second moveable contact pad 613B and first stationary contact pad 615A) may be disposed adjacent the first set of bridge contact pads (first bridge contact pad 612A and a second bridge contact pad 612B) such that the second pair of contact pads and the first set of bridge contact pads can make contact with one another in order to actuate an electrical terminal/bridge (first bridge element 602). In another example, the first pair of contact pads (second moveable contact pad 613A and second stationary contact pad 615B) may be disposed adjacent the second set of bridge contact pads such that the first pair of contact pads 613A and the second set of bridge contact pads 614A and 614B can make contact with one another in order to actuate an electrical terminal/bridge (second bridge element 604). In another example, the fourth pair of contact pads (fourth moveable contact pad 613D and third stationary contact pad 615C) may be positioned adjacent the third set of bridge contact pads (first bridge contact pad 616A and second bridge contact pad 616B) such that the fourth pair of contact pads and the third set of bridge contact pads can make contact with one another in order to actuate an electrical terminal/bridge (third bridge element 606). In another example, the third pair of contact pads (third moveable contact pad 613C and fourth stationary contact pad 615D) may be disposed adjacent the fourth set of bridge contact pads first bridge contact pad 618A and a second bridge contact pad 618B) such that the third pair of contacts and the fourth set of bridge contact pads can make contact with one another in order to actuate an electrical terminal/bridge (fourth bridge element 608).

As noted above, a length of the stationary carrier(s) 505 may be shorter than the length of the flexible carrier(s) 503 such that a distance between contact pads disposed on stationary carrier and the contact pads disposed on adjacent bridge element(s) is greater than a distance between contact pads disposed on the flexible carrier and the contact pads disposed on adjacent bridge element(s). By way of example, as depicted, the distance between bridge contact pads 612B and 614B and an adjacent pair of contact pads 615A and 615B when in an open position is greater than the distance between bridge contact pads 612A and 614A and an adjacent pair of contact pads 613A and 613B when in an open position. As noted above, the carrier body 501 of the switching component 600 may comprise an armature and a spring configured to move such that a first side of the flexible carrier 503 (e.g., corresponding with first moveable contact pad 613A and the second moveable contact pad 613B) and a second side of the flexible carrier 503 (e.g., corresponding with third moveable contact pad 613C and the fourth moveable contact pad 613D) can independently and/or sequentially make contact with adjacent bridge contact pads. Similarly, the carrier body 501 may be configured to move such that a first side of the stationary carrier 505 (e.g., corresponding with first stationary contact pad 615A and second stationary contact pad 615B) and a second side of the stationary carrier 505 (e.g., corresponding with third stationary contact pad 615C and fourth stationary contact pad 615D) can independently and/or sequentially make contact with adjacent bridge contact pads.

As such, in various embodiments, since the moveable contact pads 613A, 613B, 613C and 613D of the flexible carrier 503 may contact adjacent bridge contact pads prior to and independently of the stationary contact pads 615A, 615B, 615C and 615D of the stationary carrier 505, redundant operation of the example switching component 600 is provided. As a result of the difference in length between the flexible carrier(s) 503 and the stationary carrier(s) 505, in various examples, in response to motion of the carrier body 501, the moveable contact pads 613A, 613B, 613C and 613D of the flexible carrier 503 may make contact with adjacent/corresponding bridge contact pads 612A 614A, 616A, and 618A of the bridge elements 602, 604, 606 and 608 prior to the contact pads 615A, 615B, 615C and 615D of the stationary carrier 505 making contact with adjacent/corresponding bridge contact pads 612B, 614B, 616B and 618B. For example, if the moveable contact pads 613A, 613B, 613C and 613D of the flexible carrier 503 make proper contact with adjacent bridge contact pads, but the stationary contact pads 615A, 615B, 615C and 615D of the stationary carrier 505 fail to make proper contact with adjacent bridge contact pads, the respective electrical terminal/bridge will be actuated. Similarly, if the moveable contact pads 613A, 613B, 613C and 613D of the flexible carrier 503 fail to make proper contact with adjacent bridge contact pads, but the stationary contact pads 615A, 615B, 615C and 615D of the stationary carrier 505 make proper contact with adjacent bridge contact pads, the respective electrical terminal/bridge will be actuated.

While some of the embodiments herein provide an example switching component 600, it is noted that the scope of the present disclosure is not limited to such embodiments. For example, in some examples, a switching component 600 in accordance with the present disclosure may be in other forms. In some examples, the switching component 600 may comprise one or more additional and/or alternative elements, and/or may be structured/positioned differently than that illustrated in FIG. 6.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A switching component comprising:

a housing;

a carrier body disposed within the housing;

a first pair of contact pads disposed on a first surface of the carrier body; and a second pair of contact pads disposed on a second surface of the carrier body, wherein each pair of contact pads is configured to independently make contact with adjacent bridge contact pads in order to actuate an electrical bridge in response to movement of the carrier body, wherein each pair of contact pads comprises a movable contact pad and a stationary contact pad, wherein each moveable contact pad is configured to make contact with the adjacent bridge contact pads prior to the stationary contact pad making contact with the adjacent bridge contact pads.

2. The switching component of claim 1, wherein the first pair of contact pads comprises a first moveable contact pad and a first stationary contact pad, and wherein the second pair of contact pads comprises a second moveable contact pad and a second stationary contact pad.

3. The switching component of claim 2, wherein each moveable contact pad is disposed on a surface of a flexible carrier, and wherein each stationary contact pad is disposed on a surface of a stationary carrier.

4. The switching component of claim 3, wherein the flexible carrier is disposed on a top surface of the carrier body and the stationary carrier is disposed on a bottom surface of the carrier body.

5. The switching component of claim 2, wherein each moveable contact pad is disposed at a first distance relative to the adjacent bridge contact pads, and each stationary contact pad is disposed at a second distance relative to the adjacent bridge contact pads when the switching component is in an open position.

6. The switching component of claim 5, wherein the second distance is greater than the first distance.

7. The switching component of claim 1, wherein the switching component is configured as a single pole double throw switch.

8. The switching component of claim 1, wherein the switching component further comprises a bridge assembly, and wherein each bridge contact pad is fixedly attached thereto.

9. The switching component of claim 8, wherein the bridge assembly comprises at least a first bridge element disposed adjacent a first side surface of the carrier body and at least a second bridge element disposed adjacent a second side surface of the carrier body.

10. A switching component comprising:

a housing;

a carrier body disposed within the housing;

a first flexible carrier comprising a first moveable contact pad and a second moveable contact pad, the first flexible carrier disposed on a first surface of the carrier body; and a second flexible carrier comprising a third moveable contact pad and a fourth moveable contact pad, the second flexible carrier disposed on a second surface of the carrier body, wherein each moveable contact pad is disposed adjacent a stationary contact pad, and wherein each moveable contact pad and stationary contact pad pair is configured to independently make contact with adjacent bridge contact pads in order to actuate an electrical bridge in response to movement of the carrier body, wherein each moveable contact pad is configured to make contact with the adjacent bridge contact pads prior to the stationary contact pad making contact with the adjacent bridge contact pads.

11. The switching component of claim 10, wherein each stationary contact pad is attached to a stationary carrier disposed on a surface of the switching component.

12. The switching component of claim 10, wherein the first flexible carrier is attached to a top surface of the carrier body, and the second flexible carrier is attached to a bottom surface of the carrier body.

13. The switching component of claim 10, wherein each moveable contact pad is disposed at a first distance relative to the adjacent bridge contact pads, and each stationary contact pad is disposed at a second distance relative to the adjacent bridge contact pads when the switching component is in an open position.

14. The switching component of claim 13, wherein the second distance is greater than the first distance.

15. The switching component of claim 10, wherein the switching component is configured as a single pole double throw switch.

16. The switching component of claim 10, wherein the switching component further comprises a bridge assembly, and wherein each bridge contact pad is fixedly attached thereto.

17. The switching component of claim 16, wherein the bridge assembly comprises at least a first bridge element disposed adjacent a first side surface of the carrier body and at least a second bridge element disposed adjacent a second side surface of the carrier body.

18. The switching component of claim 16, wherein the bridge assembly comprises a first bridge element, a second bridge element, a third bridge element and a fourth bridge element.

* * * * *